| United States Patent [19] | [11] Patent Number: 4,818,799 |
| Chatterjee et al. | [45] Date of Patent: Apr. 4, 1989 |

[54] PROCESS FOR THE IN-REACTOR STABILIZATION OF POLYOLEFINS

[75] Inventors: Ananda M. Chatterjee; Robert C. Job, both of Houston, Tex.

[73] Assignee: Shell Oil Company, Houston, Tex.

[21] Appl. No.: 120,254

[22] Filed: Nov. 13, 1987

[51] Int. Cl.$^4$ ................................................ C08F 4/52
[52] U.S. Cl. ............................... 526/123; 524/174; 524/342; 524/343; 524/351; 526/351; 526/352
[58] Field of Search ............... 524/400, 432, 436, 174, 524/584, 466, 473, 491, 342, 343, 351; 526/79, 84, 113, 120, 123, 340, 351, 352; 556/181, 182; 523/210, 211; 106/296, 308 Q

[56] References Cited

U.S. PATENT DOCUMENTS

| 4,105,609 | 8/1978 | Machon et al. | 524/400 |
| 4,107,416 | 8/1978 | Giannini et al. | 556/182 |
| 4,136,243 | 1/1979 | Appleyard et al. | 526/139 |
| 4,251,407 | 2/1981 | Schroeder et al. | 524/584 |
| 4,329,253 | 5/1982 | Goodall et al. | 252/429 |
| 4,379,882 | 4/1983 | Miyata | 524/584 |
| 4,393,182 | 7/1983 | Goodall et al. | 526/125 |
| 4,400,302 | 8/1983 | Goodall et al. | 526/125 |
| 4,414,132 | 11/1983 | Goodall et al. | 526/124 |

FOREIGN PATENT DOCUMENTS

| 0200684 | 11/1986 | European Pat. Off. . |
| 1238118 | 7/1971 | United Kingdom . |
| 1554340 | 10/1979 | United Kingdom . |

OTHER PUBLICATIONS

D. Ryshavy et al., "Effect of Polymerization Catalysts On the Rate of Degradation of Isotactic Polypropylene"—SPE Transactions (Jan. 1962), pp. 25–27.

Primary Examiner—Veronica P. Hoke
Attorney, Agent, or Firm—Wendy K. B. Buskop

[57] ABSTRACT

A process for the in-reactor stabilization of an alpha olefin comprising the steps of sequentially:
adding alpha olefin monomer into a polymerization reactor;
adding a mixture of selectivity control agent and cocatalyst to the polymerization reactor;
adding a procatalyst to the polymerization reactor;
injecting an alkyl-aluminum-antioxidant into the polymerization reactor;
injecting an acid acceptor into the polymerization reactor; and
polymerizing the monomers in the reactor.

35 Claims, No Drawings

PROCESS FOR THE IN-REACTOR STABILIZATION OF POLYOLEFINS

BACKGROUND OF THE INVENTION

This invention is generally concerned with a process for in-reactor stabilization of olefins resulting in polyolefins which do not need extrusion pelletization. The present invention is directed toward an improved method for stabilizing polyolefins, in particular, stabilizing polypropylene by a method wherein during polymerization in the reactor, a procatalyst component, an alkyl aluminum-antioxidant compound and an acid acceptor is added to the olefin monomer(s), and then polymerized in association with a cocatalyst, selectivity control agent and optionally, another electron donor. The resultant polymer can be directly sold to customers without further extrusion. It is anticipated that this novel process can be used for preparing powder or alternatively granules of polypropylene (containing stabilizer) having diameters of 1–5 mm.

DETAILED DESCRIPTION OF THE INVENTION

It is intended that the present invention for in-reactor stabilization of alpha-olefins be usable in liquid polyolefin polymerization, such as LIPP (liquid propylene polymerization process), a gas phase fluidized or stirred bed polymerization process, and/or a solvent/slurry polymerization process.

The present invention involves the use of a catalyst, such as a catalyst known as a Ziegler Natta catalyst, or alternatively a high activity catalyst, such as those available from Shell Chemical Company known as SHAC®103 and SHAC®201. Other catalysts are also contemplated as usable in this invention. These catalysts may be supported catalysts.

Olefin polymerization catalysts usable in the present process can comprise a solid component, the procatalyst (comprising at least magnesium, titanium and a halogen, like chlorine), and a cocatalyst, such as an organoaluminum compound. These procatalysts and cocatalysts are also referred to as supported coordination catalysts. The activity and stereospecific performance of such compositions are generally improved by incorporating an electron donor (Lewis base) in the procatalyst, and/or by employing a third catalyst component, i.e. an electron donor also known as a selectivity control agent. The electron donor may be complexed in whole or in part with the activating organoaluminum compound.

For convenience of reference, the solid titanium-containing constituent of such catalysts will be referred to hereinafter as "procatalyst", the oranoaluminum compound, whether used separately or partially or totally complexed with an electron donor, will be referred to as "cocatalyst", and the primary electron donor compound, whether used separately or partially or totally complexed with the organoaluminum compound, will be referred to as the "selectivity control agent" (SCA).

The term "procatalyst" will typically refer to chemical combinations of magnesium chloride, titanium chloride, generally in tetravalent form, and, as electron donor, an aromatic ester, such as ethyl benzoate or ethyl-p-toluate.

The term "cocatalyst" typically is an organoaluminum compound, like aluminum triethyl or aluminum tri-isobutyl. Triethyl aluminum is a preferred cocatalyst usable within the scope of the present invention. The cocatalyst can be partially complexed with a selectivity control agent.

The phrase "selectivity control agent" typically refers to an aromatic ester such as ethyl-paramethoxybenzoate(ethyl anisate) or methyl-p-toluate.

Preferred methods for preparing procatalysts of this type are described in U.S. Pat. Nos. 4,329,253; 4,393,182; 4,400,302; and 4,414,132. These procatalysts are highly active and stereospecific. The typical manner of preparing such procatalysts involves the reaction of the magnesium compound, titanium tetrachloride and electron donor, optionally in the presence of a halohydrocarbon. It may not be necessary to use a halohydrocarbon in all situations. The resulting combined particles are then contacted with additional quantities of a tetravalent titanium halide, like $TiCl_4$. The preparations for the procatalyst are completed by washing off excess $TiCl_4$ using light hydrocarbons (e.g., isooctane and isopentane) and drying the result.

The procatalysts described above have excellent polymerization activity (polymer yield) and good stereospecific performance (isotactic content).

Preferred procatalysts can be selected from one of the following groups:

Group (I) is a polymerization catalyst composition comprising a solid component which has been obtained by halogenating a magnesium compound of the formula MgR'R" wherein R' is an alkoxide, alkyl carbonate, or aryloxide group or halogen, with a halide of tetravalent titanium and an electron donor, contacting the halogenated product with a tetravalent titanium halide, washing it to remove unreacted titanium and an electron donor, contacting the halogenated product with a tetravalent titanium halide, washing it in an inert solvent to remove unreacted titanium compounds, and recovering the solid product.

Group (II) is a polymerization catalyst composition prepared by reacting a solid component obtained by halogenating a magnesium compound of the formula MgR'R", wherein R' is an alkoxide, alkyl carbonate or aryloxide, and R" is an alkoxide, alkyl carbonate or an aryloxide group or a halogen, with a halide of tetravalent titanium, with a first electron donor, with a second electron donor therein forming a halogenated product, and therein reacting said halogenated product with a halide of tetravalent titanium; and Group (III) is a polymerization catalyst composition comprising: (a) a reaction product of an organoaluminum compound and an electron donor, and (b) a solid component which has been obtained by halogenating a magnesium compound with the formula MgR1R2 wherein R1 is an alkyl, aryl, alkoxide or aryloxide group, and R2 is an alkyl, aryl, alkoxide or aryloxide group or halogen, with a halide of tetravalent titanium in the presence of a halohydrocarbon, and contacting the halogenated product with a tetravalent titanium compound.

It is also contemplated that the procatalyst be a solid constituent containing titanium and magnesium in an atomic ratio of Ti:Mg in the range from 0.005:1 to 3:1 obtained by contacting a solid reaction product comprising a magnesium chloride, a titanium chloride with an electron donor, wherein the atomic ratio of chlorine to magnesium in the magnesium chloride is at least 1.5:1 and the electron is an ether, ester, amine, phenol or phosphine, present in a ratio of 0.091 to 5 mole of electron donor per atom of magnesium.

The organoaluminum compound to be employed as cocatalyst may be chosen from any of the known activators in olefin polymerization catalyst systems comprising a titanium halide but is most suitably free of halogens. While trialkylaluminum compounds, dialkylaluminum halides and dialkylaluminum alkoxides may be used, trialkylaluminum compounds are preferred, particularly those wherein each of the alkyl groups has 2 to 6 carbon atoms, e.g., triethylaluminum, tri-n-propylaluminum, triisobutylaluminum, triisopropylaluminum and dibutyl-n-amylaluminum. Additional specific examples of usable cocatalyst include diethylaluminum chloride, ethyl aluminum dichloride, ethyl aluminum sesquichloride and triethyl aluminum.

Suitable electron donors usable in this invention are ethers, esters, ketones, phenols amines, amides, imines, nitriles, phosphones, phosphites, stibines, arsines, phosphoramides and alcoholates.

Suitable electron donors, which are used in combination with or reacted with an organoaluminum compound as selectivity control agents and which are also used in the preparation of the solid catalyst component are ethers, esters, ketones, phenols amines, amides, imines, nitriles phosphines, phosphites, stibines, arsines, phosphoramides and alcoholates. Examples of suitable donors are those referred to in U.S. Pat. No. 4,136,243 or its equivalent British Specification No. 1,486,194 and in British Specification No. 1,554,340 or its equivalent German Offenlegungsschrift No. 2,729,126. Preferred donors are esters and diamines, particularly esters of aromatic carboxylic acids, such as ethyl and methyl benzoate, p-methoxy ethyl benzoate, p-ethoxy methyl benzoate ethyl acrylate, methyl methacrylate, ethyl acetate, dimethyl carbonate, dimethyl adipate, dihexyl fumarate, dibutyl maleate, ethylisopropyl oxalate, p-chloro ethyl benzoate, p-amino hexyl benzoate, ispropyl naphthenate, n-amyl toluate, ethyl cyclohexanoate, propyl pivalate, N,N,N',N'-tetramethtylethylene diamine, 1,2,4-trimethyl piperazine, 2,2,6,6-tetramethyl piperidine and similar compounds. The donor used as selectivity control agent (SCA) in the catalyst may be the same as or different from the donor used in preparing the titanium containing constituent. Useful selectivity control agents within the scope of this invention is diphenyl dimethoxy silane, para ethoxy ethyl benzoate, ethyl paratoluate, phenyl triethoxysilane, diisobutyl-dimethoxy silane. Preferred electron donors for use in preparing the titanium constituent are ethyl benzoate and p-methyl toluate. A preferred are selectivity control agent for use in the total catalyst system is ethyl anisate (p-methoxy ethyl benzoate).

Preferred proportions of selectivity control agent, employed separately, in combination with, or reacted with an organoaluminum compound, calculated as mol per mol aluminum compound are in the range from 0.1 to 1.0, particularly from 0.2 to 0.5.

Proportions of electron donor contained in the solid catalyst component, calculated as mol per mol of magnesium, are suitably in the range of from 0.01 to 10, e.g., from 0.05 to 10 and from 0.1 to 5.0 and especially from 0.01 to 1.0.

The acid acceptor usable within the scope of the present invention is a member of the group which consists of a metal salt of a fatty acid having from 8-28 carbon atoms, metal oxides and mixtures thereof. For the metal salts of a fatty acid, calcium pelargonate and calcium stearate are preferred acid acceptors. Zinc stearate is also contemplated as usable herein. The metal oxide most preferred for use in this invention is zinc oxide. Calcium oxide an magnesium oxide may also be useful herein. It may be possible that other acid acceptors may work in this invention, such as sodium benzoate and hydrotalcites (under suitable conditions).

The present invention may involve pretreating the acid acceptor by a method, such as soaking the acid acceptor in mineral oil prior to injecting it into the polymerization reactor to obtain good results.

The antioxidant source usable within the scope of this invention is an alkyl-aluminum-antioxidant (AAA). These compounds, as will be structurally depicted hereinbelow, are actually the alkyl aluminum phenolates of known OH hindered phenolic antioxidants. Diethylaluminum butylated hydroxy-toluene (DAB) is one of the most preferred AAA compounds usable within the scope of this invention. Additional AAA usable herein are defined in the following paragraphs.

It is possible that pretreating the catalyst with cocatalyst may enhance the desired results of this invention. For example, the catalyst may be pretreated with diethyl aluminum chloride.

Within the scope of the present invention, lubricant and mold release agents can be added to the reactor during polymerization to enhance the desired results. One such mold release agent can be N,N'-ethylene-bis-stearamide.

In the most preferred embodiment of the present invention, blends of alkyl-aluminum-antioxidant (AAA) and an acid acceptor are useful within the scope of the present invention to achieve in-reactor stabilization of polypropylene. The most preferred embodiment will be illustrated in the examples.

Methods for polymerizing alpha olefins have been taught in Shell U.S. Pat. Nos. 4,414,132 and 4,329,253. The present invention is an improvement on those and similar types of polymerization processes for alpha olefins.

This improvement involves a change in the polymerization process such that the products produced from the result of the process have improved thermo-oxidative stability.

Evaluation by oven aging and differential scanning calorimetry (DSC) oxidative induction time measurements confirm the thermo-oxidative stability of the resultant in-reactor stabilized polypropylene (PP).

Hot air oven aging was performed using standard test procedure (ASTM D3012). The polypropylene sample was first compression-molded into 10 mil thick specimens (2×2.5 inch) which were placed in a forced circulation oven. The samples were examined daily (except weekends). Failure was indicated by characteristic powdery disintegration often at the corner of the plaque.

The oxidative induction time (OIT) measurements were conducted using a differential scanning calorimeter (Perkin-Elmer DSC-2). About 5 mg of the compression-molded polypropylene plaque was used for this test. The sample was first heated at 10° C./minute under nitrogen up to the test temperature. When the test temperature was reached, the nitrogen was replaced by oxygen and the scanning was then set in the time mode. After the induction period, the sample underwent oxidation (exothermic peak). The oxidative induction time was determined from the intersection of the initial baseline with the tangent to the oxidation peak. The higher this OIT, the greater the stability of the polypropylene formulation.

Tests revealed that in-reactor stabilized PP successfully incorporates antioxidants like Ethanox 330, available from Ethyl Corporation, Butylated hydroxytoluene (BHT) and Ethanox 376, available from Ethyl Corporation into the polymer.

Corrosivity tests were performed as follows on the stabilized polymer. The corrosivity ratings were determined by a Shell test method in which 30 gram polyproylene resin is melted in a glass cup and a mild steel disc, cooled by 18° C. water, is held 1.3 cm above the polymer surface. The molten polymer is maintained at 260° C. for 30 minutes, so that the disc is exposed to the vapors from the polyproylene melt. The disc is then visually examined, rinsed with acetone, and examined by a microscope for corrosion. The ratings range from A (no visible corrosion under 30× magnification) to F (very severe corrosion). C rating represents mild corrosion (visible to naked eye) in this accelerated test, and from field experience with customers has been found to be acceptable from the viewpoint of machine corrosion.

Xylene solubles of the resultant polymers were determined as the percentage of material remaining soluble, when cooling a solution of polymer is xylene, from its boiling point to room temperature. No intermediate treatments to deactivate the catalyst or to purify the polymer by extraction were employed.

The chemical structures of the AAA compounds useful in the present unique process are as follows and wherein the symbol "+" indicates a tertiary butyl group:

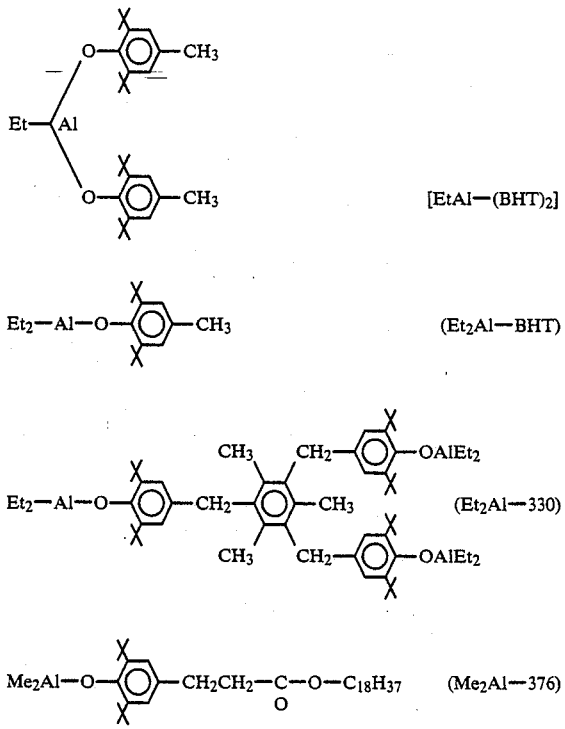

The AAA of the present invention can be either a monoalkyl or a dialkyl aluminum compound. If the AAA is a monoalkyl aluminum compound, its formula can be either:

(alkyl)Al(AO)$_2$ or (alkyl)Al(AO$_1$)(AO$_2$)

where AO is a particular antioxidant and AO$_1$ is a particular antioxidant different from AO$_2$ which is another particular antioxidant. If the AAA is a dialkyl aluminum the formula can be:

(Alkyl)$_2$Al(AO).

It is preferred that the AAA have an alkyl functional group with from 1–18 carbon atoms. Specific preferred AAA have been shown above and the antioxidants include members from the following list: 1,3,5-trimethyl-2,4,6-tris(3,5-di-tert-butyl-4-hydroxybenzyl)benzene; octadecyl 3-(3',5'-di-tert-butyl-4'-hydroxyphenyl)propionate; tetrakis[methylene(3,5-di-tert-butyl-4-hydroxyhydrocinnamate)]methane; tris[3,5-di-t-butyl-4-hydroxybenzyl)isocyanurate; 3,5-di-tert-butyl-4-hydroxyhydrocinnamic acid triester with 1,3,5-tris(2-hydroxyethyl)-s-triazine-2,4,6(1H,3H,5H)trione; 1,3,5-tris(4-tert-butyl-3-hydroxy-2,6-dimethylbenzyl) 1,3,5-triazine-2,4,6-(1H,3H,5H)-trione; bis-[3,3-bis(4'hydroxy-3'tert-butylphenyl)-butanoic acid]-glycolester; 2,2'-methylene-bis-(4-methyl-6-tertiary-butyl-phenol)-terephthalate; and 2,2-bis[4-(2-(3,5-di-tert-butyl-4-hydroxyhydrocinnamoyloxy))ethoxyphenyl]propane.

The following examples describe a method for in-reactor stabilization of propylene using an AAA.

For LIPP polymerizations using ethyl benzoate-based catalysts (examples 1–3), an autoclave with a 2.5 inch paddle stirrer and a two slat baffle was charged with 2.7 l propylene and 132 mmol hydrogen then heated to 60° C. whereupon 0.35 mmol ethyl-p-ethoxy benzoate was injected followed closely by 0.70 mmol of triethylaluminum (TEA), followed by a 5% mineral oil slurry of procatalyst containing 0.01 mmol of Ti. After the initial exotherm the reactor temperature was held at 67° C. for 1.0 hr. For the phthalate ester based catalysts (examples 4–18) the injection method was as follows: to the propylene hydrogen mixture was injected a mixture of diphenyldimethoxysilane (DPDMS) and TEA, followed by procatalyst slurry, and polymerization carried out for a one hour period at 67° C.

EXAMPLES 1-3

For Examples 1-3 propylene was polymerized using diethylaluminum-butylated hydroxy toluene (DAB) in a modified SHAC ® catalyst recipe using ethyl benzoate. Hydrogen was used as a chain transfer agent to control molecular weight. After the polymerization, the organometallic compound (AAA) released a stabilizer to achieve in-reactor stabilization of the polymer. The results follow. The amounts of AAA (DAB) injected are shown in Table 1. Table 2 shows the OIT of in-reactor stabilized polypropylene and unstabilized polypropylene. The data shows the incorporation of BHT in the polypropylene. The yield of polyropylene increased by using DEAC.

TABLE 1

Polymerization Conditions for LIPP Autoclave Runs[a] and Stability Data for In-Reactor Stabilized PP

| Run # | Vehicle for AO | Other cocatalyst | Yield (Kg PP/g.cat) | Stability of PP |
|---|---|---|---|---|
| PB921 Example 1 | DAB (0.1 mmol) | None | 4.2 | See Table 3 |
| PB917 Example 2 | DAB (0.67 mmol) | None | 14.3 | 0.09% BHT found in PP |

TABLE 1-continued

Polymerization Conditions for LIPP Autoclave Runs[a] and Stability Data for In-Reactor Stabilized PP

| Run # | Vehicle for AO | Other cocatalyst | Yield (Kg PP/g.cat) | Stability of PP |
|---|---|---|---|---|
| PB918 Example 3 | DAB (0.67 mmol) | DEAC (0.15 mmol) pretreatment[b] | 31.6 | Not measured (by IR spectroscopy) |

[a]2.7 liter autoclave, 0.01 mmol Ti, 132 millimol $H_2$, 60 mins at 67° C.

[b]"DEAC" is diethyl aluminum chloride.

TABLE 2

Oxidative Induction Times (OIT) of In-Reactor Stabilized PP and Unstabilized PP

| PP Sample | OIT (mins) at 170° C. |
|---|---|
| PB921 | 8.5 |
| Unstabilized PP | 1.6 |

OIT's were measured by a Differential Scanning Calorimeter (DSC2A).

EXAMPLES 4–16

Batch liquid propylene polymerizations were conducted using a one gallon autoclave (2.7 liter propylene charge) at 67° C. for 1 hour with $MgCl_2/TiCl_4$/diisobutylphthalate procatalyst (2.7% Ti) and diphenyldimethoxysilane (DPDMS) as SCA.

The following injections were made sequentially to the reactor containing propylene for Examples 4 through 7: (a) mixture of triethyl aluminum (TEA) (1.4 mmole) and diphenyl dimethoxy silane (as the selectivity control agent) (40 microliters), (b) catalyst (0.35 ml in mineral oil); (c) alkyl-aluminum-antioxidant (AAA) in toluene solution and (d) ZnO (Kadox 25) acid acceptor slurried in mineral oil, such as Kaydol mineral oil. The ZnO was coated with mineral oil by soaking it overnight.

The results are shown in Table 3.

In all cases, the polypropylene so produced was more stable, than unstabilized polypropylene, with the exception that the BHT containing polypropylene (Examples 5 and 6) showed relatively low oven stability. This is expected, since BHT is known to volatilize during the oven aging test. The BHT-containing samples showed evidence of stability when measured by the rapid Oxidative Induction Time (OIT) test (see Table 3). Apart from stability of the resulting product, the process using AAA provided catalyst productivity, selectivity (as measured by xylene solubles) and PP melt flow all generally in the commercially acceptable range.

The polypropylene produced using the novel process has generally higher corrosion resistance than unstabilized polypropylene.

TABLE 3

Propylene polymerization run conditions[a] and thermo-oxidative stability of the PP produced in the reactor

| Run No. | AAA used | MF[g] (dg/min) | Kg PP/g catalyst | Xylene[f] Solubles (w %) | Oven life (day) 125° C. | Oven life (day) 150° C. | OIT (mins) at 190° C. | Corrosivity |
|---|---|---|---|---|---|---|---|---|
| XG-42 (Example 4) | $Et_2Al$—330[b] | 4.0 | 17.6 | 5.7 | >34 | 7 | 11.3 | B |
| XG-44 (Example 5) | $EtAl$—$(BHT)_2$[c] | 0.73 | 10.8 | 5.4 | 3 | 1 | 2.5 | C+ |
| XG-45 (Example 6) | $Et_2Al$—BHT[d] | — | 21.8 | 6.6 | 1 | 0.3 | 3.3 | D |
| XG-47 (Example 7) | $Me_2Al$—376[e] | 3.4 | 20.5 | 4.6 | — | — | 7.1 | C+ |
| XG-48 (Control) | — | 0.50 | 21.7 | 4.3 | — | — | 1.3 | C−, D |
| Unstabilized SHAC(R) PP powder | — | 5.1 | — | 3–4 | 2 | 0.3 | 1.1 | D |

[a]All runs except XG-48 had 0.05 g ZnO (coated overnight with mineral oil). XG-48 had no acid acceptor or AAA, and represents a control SHAC ® run. Hydrogen level was 21 millimol for all runs.
[b]0.087 g.
[c]0.333 g.
[d]0.416 g.
[e]0.167 g.
[f]Xylene solubles test.
[g]Melt flow (MF) ratios of the polypropylene were measured by ASTM D1238 condition L.

Other polymerization runs with AAA and other acid acceptors (calcium stearate and calcium pelargonate) have also been found successful.

Polymerization with coated acid acceptors has been successful. It is intended as within the scope of the present invention that the acid acceptor can be pretreated by soaking it in mineral oil prior to adding it to the reactor. Soaking should provide a temporary coating on the surface of the acid acceptor to minimize interaction with the catalyst until at least mid-way through polymerization.

Three polymerizations (Examples 8–10) were attempted with the addition of neat Ethanox 330 antioxidant to the reactor. The data in Table 4 show that when neat Ethanox 330 was added to the reactor, the PP yield was zero, regardless of whether the Ethanox 330 and Ca pelargonate were pre-soaked in mineral oil.

When the Ethanox 330 was replaced by $Et_2Al$-330, as shown in Examples 11 and 12, PP was produced with good yield, good selectivity (evidenced by xylene solubles) and good stability. In particular, in experiment Example 12, the Ca pelargonate (acid acceptor) was soaked overnight in mineral oil before addition to the reactor. The run conditions in Example 11 were exactly the same in Example 13, except that the Ca pelargonate in mineral oil suspension was directly injected into the reactor, without pre-soaking. The data show that the soaking of the Ca pelargonate has a positive effect on PP yield and stability. Example 13 is a control SHAC 201 catalyst polypropylene without any additives. Example 13 represents the benchmark stability of unstabilized PP via SHAC 201 catalyst.

Batch liquid propylene polymerizations were run in a one gallon autoclave (2.7 liter propylene charge) at 67° C. for one hour, with MgCl$_2$/TiCl$_4$/diisobutylphthalate procatalyst and DPDMS as SCA. The following injections were made sequentially to the reactor containing propylene: (1) mixture of TEA (1.4 mmole) and DPDMS (40 microliter), (2) 0.4 ml catalyst in mineral oil, (3) AAA in toluene solution, and (4) acid acceptor and other additive in mineral oil.

TABLE 5

| | In-Reactor Stabilization with AAA and Various Additives Injected Into Propylene Polymerization Reactor | | | | | |
|---|---|---|---|---|---|---|
| Run No. | AAA Used | Acid Acceptor | Kg. PP/g Catalyst | XS[e] (w %) | Oven Life (Day) at 125° C. | MF[f] |
| XG-52 (Example 14) | Me$_2$Al—376[a] | Ca St[c] | 27.6 | 3.8 | 13 | 4.2 |
| XG-56 (Example 15) | Et$_2$Al—330[b] | DHT4A[d] | 7.0 | 4.0 | 0.6 | — |
| XG-54 (Example 16) | Et$_2$Al—330[b] | ZnO[c] | 20.1 | 6.3 | >190 | <0.5 |
| XG-55 | Et$_2$Al—330[b] | CaSt[d] | 0 | — | — | — |
| XG-51 (Control) | — | — | 24.4 | 4.5 | 1 | 0.9 |

All polymerizations were run with 1.4 mmole TEA and 21 mmole hydrogen. The acid acceptors were soaked overnight with mineral oil before injection into the reactor. Run XG-54 included 0.25 gm Acrawax C. Run XG-55 included Syloid 244 X1517 silica (1 gm) and erucamide (0.25 gm).
[a]0.167 gm
[b]0.221 gm
[c]0.2 gm
[d]0.25 gm
[e]Xylene solubles test.
[f]Melt flow (MF) ratios of the polypropylene were measured by ASTM D1238 condition L.

procatalyst and DPDMS as SCA. The following injections were made sequentially to the reactor containing propylene: (1) mixture of TEA (1.4 mmole) and DPDMS (40 microliter), (2) 0.4 ml catalyst in mineral oil, (3) AAA is toluene solution or heat AO (Ethanox 330) in mineral oil, and (4) acid acceptor in mineral oil.

The alkyl-Al-antioxidant approach to in-reactor stabilization has been shown to be experimentally feasible for the two-component system of hindered phenolic antioxidant and acid acceptor, as judged by PP yield, stereoselectivity and thermo-oxidative stability.

The present invention provides a means for cheaply incorporating additives into polymers, without having

TABLE 4

| | Attempted Polymerization with Neat Antioxidant and the Effect of Soaking the Acid Acceptor in Mineral Oil on In-Reactor Stabilization of PP | | | | | | | |
|---|---|---|---|---|---|---|---|---|
| Run No. | Eth. 330[a] Soaked | AAA Used[b] (gm) | Ca Pel. Soaked[c] | Kg. PP/g catalyst | XS[d] (w %) | OIT (mins) at 150° C. | OIT (mins) at 190° C. | Oven life (days) at 125° C. |
| XG-66 (Example 8) | No | — | No | 0 | — | — | — | — |
| XG-67 (Example 9) | No | — | Yes | 0 | — | — | — | — |
| XG-68 (Example 10) | Yes | — | Yes | 0 | — | — | — | — |
| XG-65 (Example 11) | — | 0.221 | No | 23.8 | 3.7 | 22.7 | — | 0.6 |
| XG-53 (Example 12) | — | 0.221 | Yes | 27.1 | 5.1 | >>24 | 24 | >170 |
| XG-48 (Example 13) | — | — | — | 21.7 | 4.3 | 9.9 | 1.3 | 1 |

All runs were made with 1.4 mmol TEA and 21 mmol hydrogen.
[a]0.50 gm neat AO used.
[b]Et$_2$Al—330.
[c]0.25 gm used.
[d]Xylene solubles test.

Table 5 shows results of polymerization using several extra additives. Examples 14 and 16 indicate good PP yield, stereoselectivity and oven stability. Example 16 is noteworthy, since in this run Acrawax ® C (N,N'-ethylene-bis-stearamide, a lubricant and mold release agent) was also injected into the reactor. The Acrawax C powder, like the ZnO, was soaked overnight in mineral oil before its injection into the reactor. Example 15 using hydrotalcite DHT-4A (MgAl hydroxy carbonate hydrate) acid acceptor gave low PP yield and very low stability.

Batch liquid propylene polymerizations were run in a one-gallon autoclave (2.7 liter propylene charge) at 67° C. for one hour, with MgCl$_2$/TiCl$_4$/diisobutylphthalate procatalyst and DPDMS as SCA. The following injecto additionally compound the polymer with the additives using energy intensive mixers, like extruders. The novel process has lower energy and capital cost requirements, compared to the single or twin screw extrusion technology.

What is claimed is:

1. A process for the in-reactor stabilization of an alpha olefin comprising the steps of sequentially:
adding alpha-olefin monomer into a polymerization reactor;
adding a selectivity control agent and cocatalyst separately, in combination, or reacted together to the polymerization reactor;

adding a procatalyst to the polymerization reactor;
injecting an alkyl-aluminum-antioxidant derived from an OH hindered phenolic antioxidant into the polymerization reactor;
injecting an acid acceptor into the polymerization reactor; and
polymerizing the monomer.

2. The process of claim 1 wherein the alpha olefin is propylene.

3. The process of claim 1, wherein the olefin polymerization procatalyst compositions comprise a solid component which has been obtained by halogenating a magnesium compound of the formula MgR'R" wherein R' is an alkoxide, alkyl carbonate or aryloxide group or halogen, with a halide of tetravalent titanium and an electron donor, contacting the halogenated product with a tetravalent titanium halide, washing it to remove unreacted titanium and an electron donor, contacting the halogenated product with a tetravalent titanium halide, washing it in an inert solvent to remove unreacted titanium compounds, and recovering the solid product.

4. The process of claim 1, wherein the procatalyst is a polymerization catalyst composition prepared by reacting a solid component obtained by halogenating a magnesium compound of the formula MgR'R", wherein R' is an alkoxide, alkyl carbonate or aryloxide, and R" is an alkoxide, alkyl carbonate or an aryloxide group or a halogen, with a halide of tetravalent titanium, with a first electron donor, with a second electron donor therein forming a halogenated product, and therein reacting said halogenated product with a halide of tetravalent titanium.

5. The process of claim 1 wherein the procatalyst is a polymerization catalyst composition comprising: (a) a reaction product of an organoaluminum compound and an electron donor, and (b) a solid component which has been obtained by halogenating a magnesium compound with the formula MgR1R2 wherein R1 is an alkyl, aryl, alkoxide or aryloxide group, and R2 is an alkyl, aryl, alkoxide or aryloxide group or halogen, with a halide of tetravalent titanium in the presence of a halohydrocarbon, and contacting the halogenated product with a tetravalent titanium compound.

6. The process of claim 1, wherein the procatalyst is a solid constituent containing titanium and magnesium in an atomic ratio of Ti:Mg in the range from 0.005:1 to 3:1 obtained by contacting a solid reaction product comprising a magnesium chloride, a titanium chloride with an electron donor, wherein the atomic ratio of chlorine to magnesium in the magnesium chloride is at least 1.5:1 and the electron donor is an ether, ester, amine, phenol or phosphine, present in a ratio of 0.091 to 5 mole of electron donor per atom of magnesium.

7. The process of any one of claims 3, 4, 5, and 6 wherein the procatalyst is disposed on an inert support selected from the group comprising: silica, alumina, and magnesium silicate or mixtures thereof.

8. The process of any one of claims 3, 4, 5, and 6 wherein the procatalyst is disposed on a spherical inert support.

9. The process of claim 3, wherein said procatalyst is a solid constituent containing a reaction product comprising titanium tetrachloride and an ester of an aromatic monocarboxylic acid on a magnesium halide support.

10. The process of claim 3, wherein said procatalyst is a solid constituent containing a reaction product comprising titanium tetrachloride and an ester of an aromatic dicarboxylic acid on a magnesium halide support.

11. The process of any one of claims 9 and 10 wherein the magnesium halide support is magnesium chloride.

12. The process of claim 9, wherein the ester of an aromatic monocarboxylic acid is a member of the group consisting of ethylbenzoate, and ethyl-para-toluate.

13. The process of claim 10, wherein the ester of an aromatic dicarboxylic acid is a dialkylphthalate.

14. The process of claim 13, wherein the dialkylphthalate is a member of the group consisting of diisobutylphthalate, ethyl isobutylphthalate, and diethylphthalate.

15. The process of claim 1, wherein said cocatalyst is an organoaluminum compound.

16. The process of claim 1, wherein said cocatalyst is selected from the group comprising of diethylaluminum chloride, ethylaluminum dichloride, ethylaluminum sesquichloride and tri-ethyl aluminum.

17. The process of claim 1, wherein the acid acceptor is a member of the group consisting of: a metal salt of a fatty acid having from 8–28 carbon atoms, a metal oxide, and mixtures thereof.

18. The process of claim 1, further comprising the step of soaking the acid acceptor in an inert hydrocarbon carrier, coating the acid acceptor prior to injecting said acceptor into the polymerization reactor.

19. The process of claim 18, wherein the inert hydrocarbon carrier is mineral oil.

20. The process of claim 1, further comprising the step of soaking the acid acceptor in a solution of a member of the group consisting of hexane, heptane, and toluene, coating the acid acceptor prior to injecting said acceptor into the polymerization reactor.

21. The process of claim 1 wherein the procatalyst is pretreated with diethyl aluminum chloride.

22. The process of claim 1, wherein the selectivity control agent consists of a member of the group comprising an aromatic carboxylic acid ester, an alkoxy silane, and a hindered amine.

23. The process of claim 1, wherein the selectivity control agent is selected from the group comprising diisobutyldimethoxy silane, diphenyldimethoxy silane, para-ethoxyethyl benzoate, ethyl paratoluate, paramethoxy ethyl benzoate, phenyl triethoxysilane, ethyl benzoate, paramethyl toluate, p-methoxy ethyl benzoate, and 2,2,6,6-tetramethyl piperidine.

24. The process of claim 1, further comprising the step of adding a lubricant and mold release agent into the reactor after the alkyl-aluminum phenolate antioxidant and the acid acceptor are added to the polymerization reactor.

25. The process of claim 24, wherein the lubricant and mold release agent is an N,N'-ethylene-bis-stearamide.

26. The process of claim 1, wherein the alkyl aluminum phenolate antioxidant is a monoalkyl aluminum compound.

27. The process of claim 1, wherein the alkyl aluminum phenolate antioxidant is a dialkyl aluminum compound.

28. The process of claim 1, wherein the alkyl aluminum phenolate antioxidant is a monoalkyl aluminum compound derived from two dissimilar antioxidants.

29. The process of claim 1, wherein said alkyl aluminum phenolate antioxidant comprises an alkyl functional group with from 1–18 carbon atoms.

30. The process of claim 26, wherein the hindered phenolic antioxidant can be a member of the group:
1,3,5-trimethyl-2,4,6-tris(3,5-di-tert-butyl-4-hydroxybenzyl)benzene; octadecyl 3-(3',5'-di-tert-butyl-4'-hydroxyphenyl)propionate; tetrakis[methylene(3,5-di-tert-butyl-4-hydroxyhydrocinnamate)]methane; tris[3,5-di-t-butyl-4-hydroxybenzyl)isocyanurate; 3,5-di-tert-butyl-4-hydroxyhydrocinnamic acid triester with 1,3,5-tris(2-hydroxyethyl)-s-triazine-2,4,6(1H,3H,5H)-trione; 1,3,5-tris(4-tert-butyl-3-hydroxy-2,6-dimethylbenzyl) 1,3,5-triazine-2,4,6-(1H,3H,5H)-trione; bis-[3,3-bis(4'-hydroxy-3'tert-butyl-phenyl)-butanoic acid]-glycolester; 2,2'-methylene-bis-(4-methyl-6-tertiary-butyl-phenol)-terephthalate; and 2,2-bis[4-(2-(3,5-di-tert-butyl-4-hydroxyhydrocinnamoyloxy))ethoxyphenyl]propane.

31. The process of claim 17, wherein the metal salt of a fatty acid is a member of the group comprising calcium pelargonate, and calcium stearate.

32. The process of claim 17, wherein the metal salt of a fatty acid is a zinc stearate.

33. The process of claim 17, wherein the metal oxide is zinc oxide.

34. The process of claim 17, wherein the metal oxide is calcium oxide.

35. The process of claim 17, wherein the metal oxide is magnesium oxide.

* * * * *